(12) United States Patent
Fujimoto

(10) Patent No.: US 8,171,214 B2
(45) Date of Patent: May 1, 2012

(54) STORAGE SUBSYSTEM, STORAGE SYSTEM, AND METHOD OF CONTROLLING POWER SUPPLY TO THE STORAGE SUBSYSTEM

(75) Inventor: Kazuhisa Fujimoto, Koganei (JP)

(73) Assignee: Hitachi, Ltd., Tokyo (JP)

( * ) Notice: Subject to any disclaimer, the term of this patent is extended or adjusted under 35 U.S.C. 154(b) by 482 days.

(21) Appl. No.: 11/855,276

(22) Filed: Sep. 14, 2007

(65) Prior Publication Data
US 2008/0256307 A1    Oct. 16, 2008

(30) Foreign Application Priority Data

Oct. 17, 2006  (JP) .................................. 2006-282367

(51) Int. Cl.
*G06F 12/00* (2006.01)
(52) U.S. Cl. ......... 711/114; 711/154; 711/165; 711/170
(58) Field of Classification Search .................... 711/114
See application file for complete search history.

(56) References Cited

U.S. PATENT DOCUMENTS

| | | | | |
|---|---|---|---|---|
| 7,035,972 | B2 * | 4/2006 | Guha et al. ..................... | 711/114 |
| 7,085,904 | B2 * | 8/2006 | Mizuno et al. ................ | 711/162 |
| 7,111,147 | B1 * | 9/2006 | Strange et al. ................ | 711/209 |
| 7,281,088 | B2 * | 10/2007 | Yamazaki et al. ............ | 711/114 |
| 7,353,406 | B2 * | 4/2008 | Yagisawa et al. ............. | 713/300 |
| 2003/0193732 | A1 * | 10/2003 | Hakamata et al. ............. | 360/69 |
| 2004/0054939 | A1 * | 3/2004 | Guha et al. .................... | 713/300 |

FOREIGN PATENT DOCUMENTS

| | | |
|---|---|---|
| JP | 2004 355188 | 12/2004 |
| JP | 2005 157710 | 6/2005 |

OTHER PUBLICATIONS

D. Li, H. Cai, X. Yao, and J. Wang, "Exploiting redundancy to construct energy-efficient, high-performance RAIDs," Tech. Rep. TR-05-07-04, Computer Science and Engineering Department, University of Nebraska Lincoln, 2005.*
"Power-efficient Server-class Performance from Arrays of Laptop Disks" by A. Papathanasiou, et al., May 2004.

* cited by examiner

*Primary Examiner* — Matthew Bradley
*Assistant Examiner* — Kalpit Parikh
(74) *Attorney, Agent, or Firm* — Brundidge & Stanger, P.C.

(57) ABSTRACT

Provided is storage subsystem including: a storage unit containing multiple disk groups; and a control device for controlling the storage unit. The storage unit includes at least one redundant disk group composed of at least a first disk group and a second disk group for redundancy. The control device is configured to: put the first disk group into a power-on state; put the second disk group into a power-off state; read/write data stored in the first disk group; turns on power of the second disk group at a predetermined timing; write, in the second disk group, data that has been written in the first disk group while the second disk group has been in the power-off state; and put one of the first and second disk group into the power-on state and the other one of the first and second disk group into the power-off state after the writing.

16 Claims, 14 Drawing Sheets

100 : LOGICAL VOLUME (LU) - VIRTUAL RAID GROUP - RAID GROUP ASSOCIATION TABLE

| VIRTUAL RAID GROUP # | LU # | RAID GROUP # | LOCAL # | POWER STATUS | SYNC. STATUS |
|---|---|---|---|---|---|
| 0 | 1,2,3 | 0 | 1 | ON | 0 |
|  |  | 1 | 2 | OFF |  |
| 1 | 11,12,13,14 | 2 | 1 | ON | 0 |
|  |  | 3 | 2 | OFF |  |
| 2 | 4,5 | 4 | 1 | OFF | 0 |
|  |  | 5 | 2 | ON |  |
| 3 | 38,39,40 | 6 | 1 | ON | 0 |
|  |  | 7 | 2 | OFF |  |
| 4 | 127 | 8 | 1 | ON | 1 |
|  |  | 9 | 2 | ON |  |
| ⋮ | ⋮ | ⋮ | ⋮ | ⋮ | ⋮ |
| 12 | 0,10,11,12 | 24 | 1 | OFF | 0 |
|  |  | 25 | 2 | ON |  |
| 13 | 21,22 | 26 | 1 | OFF | 0 |
|  |  | 27 | 2 | ON |  |
| 14 | 0 | 28 | 1 | ON | 1 |
|  |  | 29 | 2 | ON |  |
| 15 | 122,123,124 | 30 | 1 | ON | 0 |
|  |  | 31 | 2 | OFF |  |
| ⋮ | ⋮ | ⋮ | ⋮ | ⋮ | ⋮ |
| 31 | 7,8 | 62 | 1 | ON | 0 |
|  |  | 63 | 2 | OFF |  |

FIG. 2

200 : RAID GROUP-DATA SYNCHRONIZATION START TIME/
POWER SWITCHING TIME ASSOCIATION TABLE

| VIRTUAL RAID GROUP # | RAID GROUP # | DATA SYNCHRONIZATION START TIME | POWER ON/OFF SWITCHING TIME |
|---|---|---|---|
| 0 | 0 | 00:00 | 00:30 |
|   | 1 | 12:00 | 12:30 |
| 1 | 2 | 00:30 | 01:00 |
|   | 3 | 12:30 | 13:00 |
| 2 | 4 | 01:00 | 01:30 |
|   | 5 | 13:00 | 13:30 |
| 3 | 6 | 01:30 | 02:00 |
|   | 7 | 13:30 | 14:00 |
| 4 | 8 | 02:00 | 02:30 |
|   | 9 | 14:00 | 14:30 |
| : | : | : | : |
| 12 | 24 | 06:00 | 06:30 |
|   | 25 | 18:00 | 18:30 |
| 13 | 26 | 06:30 | 07:00 |
|   | 27 | 18:30 | 19:00 |
| 14 | 28 | 07:00 | 07:30 |
|   | 29 | 19:00 | 19:30 |
| 15 | 30 | 07:30 | 08:00 |
|   | 31 | 19:30 | 20:00 |
| : | : | : | : |
| 31 | 62 | 15:30 | 16:00 |
|   | 63 | 03:30 | 04:00 |

FIG. 5

210 : RAID GROUP-DATA SYNCHRONIZATION START TIME/
POWER SWITCHING TIME ASSOCIATION TABLE

| VIRTUAL RAID GROUP # | RAID GROUP # | POWER | DATA SYNCHRONIZATION START TIME | POWER ON/OFF SWITCHING TIME |
|---|---|---|---|---|
| 0 | 0 | ON | 00:00 06:00 | 00:30 |
|  | 1 | OFF | 12:00 18:00 | 12:30 |
| 1 | 2 | ON | 00:30 06:30 | 01:00 |
|  | 3 | OFF | 12:30 18:30 | 13:00 |
| 2 | 4 | OFF | 01:00 07:00 | 01:30 |
|  | 5 | ON | 13:00 19:00 | 13:30 |
| ⋮ | ⋮ | ⋮ | ⋮ | ⋮ |
| 12 | 24 | OFF | 06:00 12:00 | 06:30 |
|  | 25 | ON | 18:00 00:00 | 18:30 |
| 13 | 26 | OFF | 06:30 12:30 | 07:00 |
|  | 27 | ON | 18:30 00:30 | 19:00 |
| ⋮ | ⋮ | ⋮ | ⋮ | ⋮ |
| 31 | 62 | ON | 15:30 | 16:00 |
|  | 63 | OFF | 03:30 | 04:00 |

*FIG. 7*

STORAGE SUBSYSTEM, STORAGE SYSTEM, AND METHOD OF CONTROLLING POWER SUPPLY TO THE STORAGE SUBSYSTEM

CLAIM OF PRIORITY

The present application claims priority from Japanese patent application JP 2006-282367 filed on Oct. 17, 2006, the content of which is hereby incorporated by reference into this application.

BACKGROUND

This invention relates to a storage system which stores data of a computer, and more particularly, to a storage subsystem composed of multiple disk devices and control of power supply to the multiple disk devices.

Conventional storage systems are equipped with a relatively high-performance and highly-reliable disk device (hard disk drive: HDD) that has a fibre channel (FC) interface (FC-HDD), as opposed to an inexpensive HDD that is mounted to personal computers (PC) and has an Advanced Technology Attachment (ATA) interface.

Recently, an inexpensive HDD that has a serial advanced technology attachment (SATA) interface (SATA-HDD), which is a high-speed version of the ATA interface, is beginning to gain popularity as an HDD for PCs. The SATA-HDD, when mounted to a storage system as a recording medium in place of the FC-HDD, provides an inexpensive, large-capacity storage system. This trend is especially prominent in mid-range to low-end storage systems where required performance is not particularly high and a lower-priced device is appreciated more.

On the other hand, storage systems for enterprises where high performance and high reliability are required use the high-performance, reliable FC-HDD, although enterprises now have an option of employing recently commercialized storage systems for enterprises which have the partial inexpensive SATA-HDD in addition to the FC-HDD and use the SATA-HDD for archive data storage where the required performance is not so high.

Power saving in IT systems has lately become an issue especially in data centers. Power saving leads to a cut in overall running cost of a system and ultimately to a reduced total cost of ownership (TOC) of the system. There has been a report that the data centers spend about 20% to 30% of electric power on their storage systems, so power saving in the storage systems is counted as one of future important issues.

A measure to solve this issue is disclosed in "Power-efficient Server-class Performance from Arrays of Laptop Disks", University of Rochester, Technical Report 837, May 2004. The article discloses a technique of using in a storage system a mobile SATA-HDD, which consumes merely half to one-ninth of electric power consumed by the FC-HDD, instead of the high-performance and reliable but power-consuming FC-HDD.

The technique according to the article equipped with three mobile SATA-HDDs in place of one FC-HDD. Only one of the SATA-HDDs is in operation while required data read performance is low, and as higher read performance is demanded, the number of operating SATA-HDDs is increased from one to two or three. Here, one FC-HDD is substituted with three SATA-HDDs because the collective read performance of the three SATA-HDDs is higher than the read performance of one FC-HDD whereas collective power consumption of the three SATA-HDDs is less than the power consumption of one FC-HDD.

SUMMARY

Heavy price cutting is common in a storage system market, and even prices of storage systems for enterprises drop on average 30% or more per year. As to hard disk prices, the inexpensive SATA-HDD, which is widely used as an HDD for PCs, costs half to one-ninth of the price of an equal-capacity FC-HDD.

A possible way to conform to the price cutting at a rate of 30% or more per year in the market of storage systems for enterprises is to use the SATA-HDD for most of HDDs in an enterprise storage system.

However, an enterprise storage system that uses the SATA-HDD for most of its HDDs fails to meet a required level of performance and reliability because the performance and reliability of the SATA-HDD are insufficient as compared to those of the FC-HDD.

The performance of a storage system can be improved by installing more SATA-HDDs than FC-HDDs in the storage system, thus increasing the number of HDDs that process access requests in parallel. Since the price of a single SATA-HDD is half to one-ninth of the price of an equal-capacity FC-HDD, installing twice to nine times more number of SATA-HDDs than FC-HDDs in a storage system costs less than when all HDDs in the storage system are FC-HDDs.

A problem of using the SATA-HDD in place of the FC-HDD is insufficient reliability, particularly in terms of HDD lifespan. Whereas the FC-HDD is ensured to last for five years when the FC-HDD is to operate 24 hours a day and 365 days a year, the SATA-HDD is ensured to last for three years when the SATA-HDD is to operate 10 to 11 hours a day (about 333 hours a month). Also, the mean time between failure (MTBF) of the SATA-HDD is approximately half of the MTBF of the FC-HDD. Storage systems for enterprises are ensured to last for five years when they are to operate 24 hours a day and 365 days a year. It is therefore necessary in employing the SATA-HDD for most of HDDs in an enterprise storage system to make the lifespan and MTBF of the SATA-HDDs at least equal to those of the FC-HDDs.

The technique disclosed in the above article uses three mobile SATA-HDDs in place of one FC-HDD to change the number of operating SATA-HDDs in accordance with the required read performance. This way, the SATA-HDDs do not need to be kept in operation all the time, and the shortened operation time improves the SATA-HDDs' lifespan and MTBF.

A drawback of the technique of the article is that the SATA-HDDs' operation time cannot be shortened and accordingly their lifespan and MTBF cannot be improved when the required read performance is always so high that all three SATA-HDDs are required to be put into operation. Another drawback of the technique is that, during data write, all three SATA-HDDs have to be in operation and data has to be written in triplicate since data in the three SATA-HDDs must be kept consistent to one another.

A representative aspect of this invention is as follows. That is, there is provided a storage subsystem coupled to a computer, including: a storage unit containing multiple disk groups each of which is composed of at least one disk drive; and a control device for controlling data read/write in the storage unit. The storage unit includes at least one redundant disk group composed of at least a first disk group and a second disk group for redundancy. The control device includes an interface that is connected to the computer, an interface that is connected to the at least one disk drive, a cache memory for temporarily storing data read from/written in the at least one disk drive, and a power controller for controlling power supply to the multiple disk groups. The control device is configured to: put the first disk group into a power-on state where at least one disk drive in the first disk group is powered on; put the second disk group into a power-off state where every disk drive in the second disk group is powered off; read/write, upon reception of a data read/write request from the computer, data stored in the first disk group; turn on power of the second disk group at a predetermined first timing; write, in the second disk group, data that has been written in the first disk group while the second disk group has been in the power-off state; and put one of the first disk group and the second disk group into the power-on state and the other one of the first disk group and the second disk group into the power-off state after the writing.

According to an aspect of this invention, the SATA-HDD lifespan and MTBF can be prolonged and the SATA-HDD can be used for a predominant number of HDDs in an enterprise storage system. As a result, an enterprise storage system can be provided at a low price.

BRIEF DESCRIPTION OF THE DRAWINGS

The present invention can be appreciated by the description which follows in conjunction with the following figures, wherein:

FIG. 2 shows a logical volume (LU)—virtual RAID group—RAID group association table in accordance with the first embodiment of this invention;

FIG. 5 shows a RAID group-data synchronization start time/power switching time association table which is an example of the power supply control management information in accordance with the first embodiment of this invention;

FIG. 7 is a diagram showing a RAID group-data synchronization start time/power switching time association table, which is used in the case where data is to be synchronized multiple times before one of the RAID groups that has been powered on is powered off and the other RAID group that has been powered off is powered on in accordance with the first embodiment of this invention;

DETAILED DESCRIPTION OF THE PREFERRED EMBODIMENTS

<First Embodiment>

Figure 1:
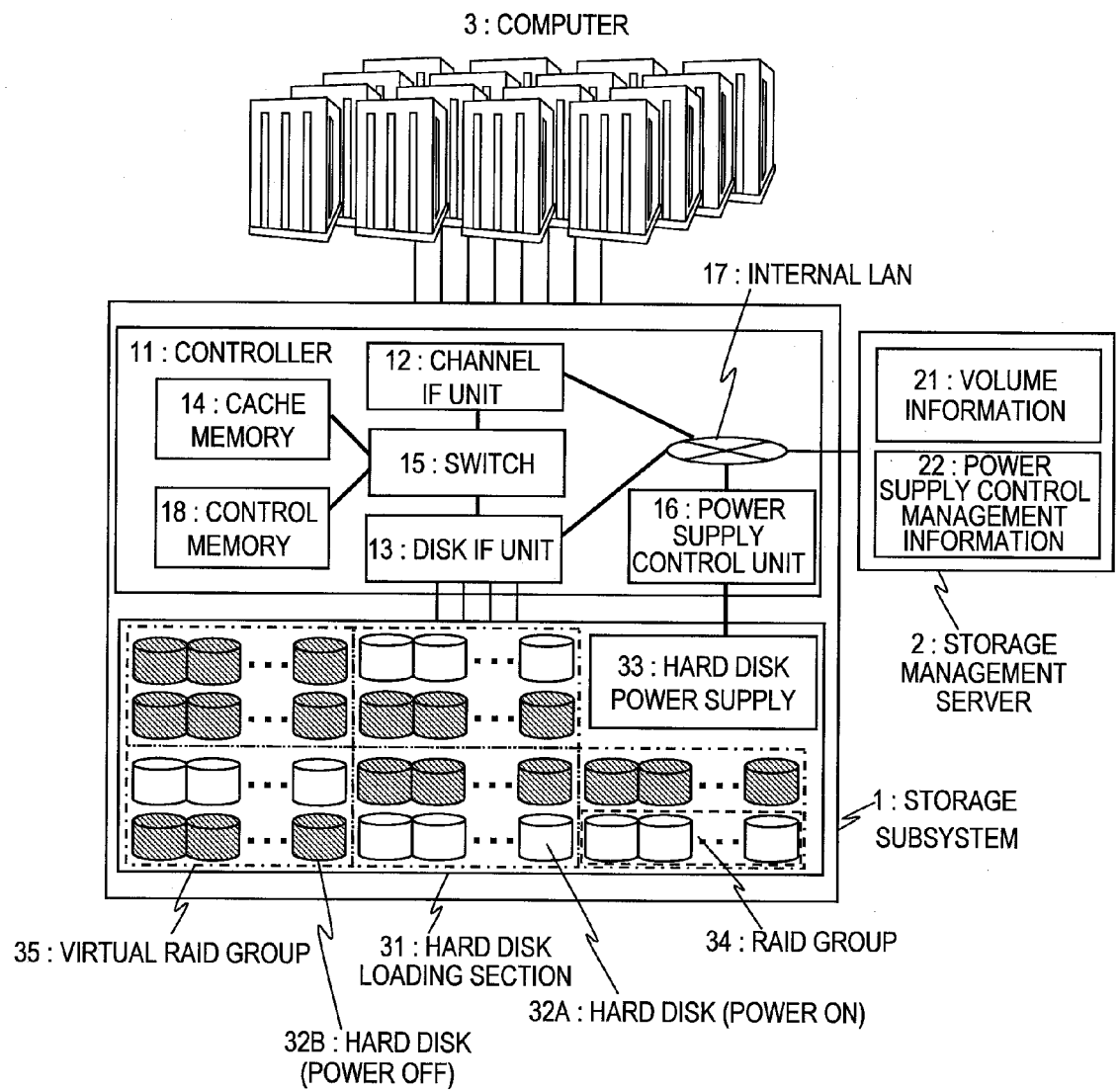
FIG. 1 is a diagram showing the configuration of a computer system that contains a storage subsystem in accordance with a first embodiment of this invention.

FIG. 1 is a diagram showing the configuration of a computer system that contains a storage subsystem according to a first embodiment of this invention. The computer system has a storage subsystem 1, a storage management server 2, and a computer 3. The storage subsystem 1 is connected to the computer 3 as shown in FIG. 1. The storage subsystem 1 and the computer 3 may be connected to each other via a switch.

The storage subsystem 1 has a controller 11 and a hard disk loading section 31. The controller 11 has a channel interface (IF) unit 12, a disk IF unit 13, a cache memory 14, a control memory 18, a switch 15, and a power supply control unit (power controller) 16.

The channel IF unit 12 is connected to the computer 3 to control data read/write in a hard disk as requested by the computer 3. The channel IF unit 12 controls data transfer to and from the cache memory 14 upon reception of data read/write requests from the computer 3.

The disk IF unit 13 is connected to multiple hard disks 32 to control data read/write in the hard disks 32. The disk IF unit 13 controls data transfer to and from the cache memory 14 when data is read from or written in the hard disks 32.

The controller 11 thus sends and receives data between the channel IF unit 12 and the disk IF unit 13 via the cache memory 14, thereby reading/writing data in the hard disks 32 as requested by the computer 3.

The control memory 18 stores control information of the cache memory 14, which temporarily stores data read from or written in the hard disks 32, and control information of the controller 11.

The channel IF unit 12 and the disk IF unit 13 each contain one or more processors (not shown). The processors in the channel IF unit 12 and the disk IF unit 13 send and receive control information via the control memory 18, to thereby control the entire storage subsystem 1. The processors in the channel IF unit 12 and the disk IF unit 13 are connected to an internal LAN 17. The storage management server 2 is also connected to the internal LAN 17.

The switch 15 connects the channel IF unit 12, the disk IF unit 13, the cache memory 14, and the control memory 18. The switch 15 is generally composed of multiple switches, but can be composed of multiple shared busses. The power supply control unit 16 controls power supply to the hard disks 32, and is connected to the internal LAN 17.

The above-mentioned configuration of the controller 11 is merely an example. The controller 11 can take other configurations than the one shown in FIG. 1 as long as the controller 11 has a function of reading/writing data in the hard disks 32 in response to a request from the computer 3.

The hard disk loading section 31 has the multiple hard disks 32 and a hard disk power supply 33, which supplies power to the individual hard disks 32 separately.

The hard disks 32 in the first embodiment are inexpensive hard disks (hereinafter abbreviated as inexpensive HDDs) which are lower in reliability than high-performance, reliable hard disks. Examples of high-performance, reliable hard disks include a hard disk that has the FC interface and a hard disk that has a serial attached SCSI (SAS) interface. An example of inexpensive HDDs is a hard disk that has the SATA interface.

Each RAID group 34 is composed of two or more of the hard disks 32. Each virtual RAID group 35 in this embodiment is composed of two RAID groups 34. There are several types of power status for the virtual RAID group 35, including a state where the power of one of the constituent RAID groups 34 is on whereas the power of the other RAID group 34 is off, and a state where the power of both of the constituent RAID groups 34 is on. Details of the power status will be described later with reference to FIG. 3A to FIG. 3D.

The virtual RAID group 35, which, in the first embodiment, contains two RAID groups 34, may contain three or more RAID groups 34. Preferably, when the per-bit cost of the employed inexpensive HDD is 1/n or less of the per-bit cost of a high-performance, reliable hard disk, n or fewer RAID groups 34 are contained in each virtual RAID group 35.

One (or two in the case of constructing a redundant configuration) hard disk power supply 33 may be provided for each of the hard disks 32, or for each RAID group 34, or for each virtual RAID group 35. The power supply control unit 16 may be contained in the hard disk loading section 31 instead of inside the controller 11. The power supply control unit 16 may be connected directly to the storage management server 2. In FIG. 1, a hard disk 32A, which is powered on, is represented by a plain cylindrical shape whereas a hard disk 32B, which is powered off, is represented by a hatched cylindrical shape.

The storage management server 2 has volume information 21 and power supply control management information 22.

The volume information 21 contains the association relation between each virtual RAID group 35 and two RAID groups 34 (a RAID group #1 and a RAID group #2) that constitute the virtual RAID group 35. The virtual RAID group 35 is a logical volume and is associated with the RAID group #1 and the RAID group #2 which are physical volumes.

The volume information 21 also contains information indicating the power-on status or power-off status of the RAID groups #1 and #2, and information indicating whether or not processing of synchronizing the RAID groups #1 and #2 with each other is being executed. The volume information 21 further contains the association relation between each virtual RAID group 35 and a logical volume (LU) that is allocated to the computer 3 from the virtual RAID group 35.

FIG. 2 shows a logical volume (LU)—virtual RAID group—RAID group association table 100, which is an example of the information contained in the volume information 21 according to the first embodiment. In the logical volume (LU)—virtual RAID group—RAID group association table 100, Local Number (#) is attached as a simple way of discriminating two RAID groups 34 that constitute one virtual RAID group 35 from each other.

The relation between each virtual RAID group 35 and its associated RAID groups 34 and LU may be created automatically by the controller 11 or the storage management server 2, or may be entered by an administrator through a terminal that is connected to the controller 11 or to the storage management server 2. Alternatively, the relation may be created automatically by the controller 11 or the storage management server 2 from a condition entered by the administrator.

The power status and the data synchronization status (sync. status) are entered in the association table 100 through an inquiry made by the storage management server 2 to the controller 11, or through regular notification made by the controller 11 to the storage management server 2.

The association table of FIG. 2 is merely an example. Other formats than the one shown in FIG. 2 can be employed as long as the association between each virtual RAID group 35 and its constituent RAID groups 34, the power status of the RAID groups 34, the data synchronization status between the two RAID groups 34, and the association relation between the virtual RAID group 35 and its logical volume (LU) can be grasped from the association table 100. The volume information 21 may be divided into multiple tables.

The power supply control management information 22 contains a time at which the power is turned on or off for each of the RAID groups #1 and #2 that constitute one virtual RAID group 35, and a time at which data in the RAID group #1 and data in the RAID group #2 are synchronized with each other.

FIG. 5 shows a RAID group-data synchronization start time/power switching time association table 200 which is an example of the power supply control management information 22 according to the first embodiment. The RAID group-data synchronization start time/power switching time association table 200 contains a virtual RAID group column, a RAID group column, a data synchronization start time column, and a power on/off switching time column.

The power supply control unit 16 receives the RAID group-data synchronization start time/power switching time association table 200 from the storage management server 2. The power supply control unit 16 then synchronizes data in the RAID group #1 and data in the RAID group #2 that constitute one virtual RAID group 35 with each other, and turns the power of these RAID groups 34 on or off.

The data synchronization start time and the power on/off switching time may be entered by an administrator through a terminal that is connected to the controller 11 or to the storage management server 2. Alternatively, the data synchronization start time and the power on/off switching time may be created automatically by the controller 11 or the storage management server 2 from a condition entered by the administrator. For instance, a time interval is entered by the administrator and the data synchronization start time or the power on/off switching time is created such that the processing is executed periodically.

The format of the RAID group-data synchronization start time/power switching time association table 200 in FIG. 5 is merely an example. Other formats than the one shown in FIG. 5 may be employed as long as the data synchronization start time and power on/off switching time of each RAID group 34 can be grasped from the association table 200. The information in the association table 200 may be contained in the logical volume (LU)—virtual RAID group—RAID group association table 100 shown in FIG. 2.

FIG. 3A to FIG. 3D are diagrams showing the concept of alternately powering on the RAID group #1 and the RAID group #2 that are contained in one virtual RAID group 35 according to the first embodiment.

Figure 3A:
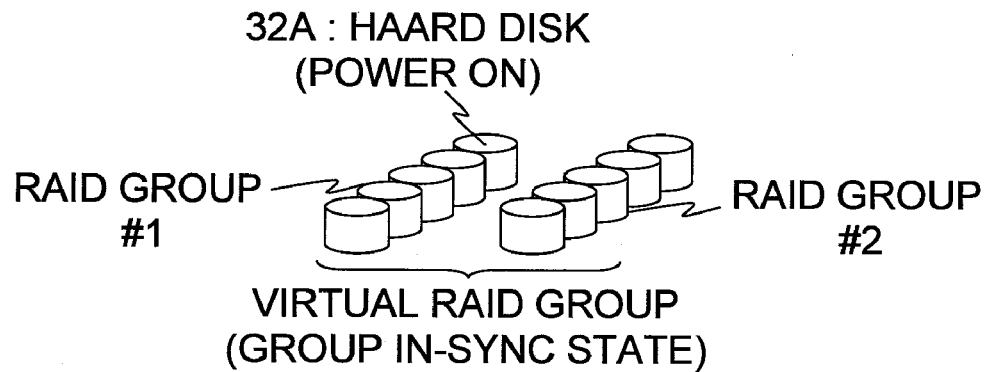
FIG. 3A is a diagram showing a state where the power of every RAID group is turned on upon activation of the storage subsystem in accordance with the first embodiment of this invention.

FIG. 3A is a diagram showing a state where the power of every RAID group 34 in the virtual RAID group 35 is turned on upon activation of the storage subsystem 1 according to the first embodiment.

As the storage subsystem 1 is activated, the controller 11 first turns on the power of every RAID group 34 in the virtual RAID group 35 to synchronize data in the RAID group #1 and data in the RAID group #2 that are contained in the virtual RAID group 35 with each other. In other words, for each address in the RAID group #1 and the RAID group #2, the controller 11 makes data stored at an address in the RAID group #1 identical with data stored at the same address in the RAID group #2. The state where every RAID group 34 that constitute one virtual RAID group 35 is powered on and data is synchronized is referred to as "group in-sync state".

Figure 3B:
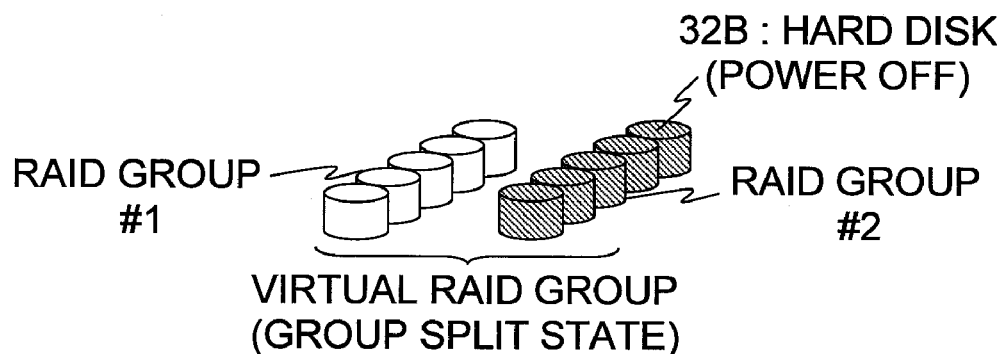
FIG. 3B is a diagram showing a state where power supply to the RAID group #2 is shut off after confirmation of the synchronization state in accordance with the first embodiment of this invention.

FIG. 3B is a diagram showing a state where power supply to the RAID group #2 is shut off after confirmation of the synchronization state according to the first embodiment.

In this state, the controller 11 puts hard disks in the RAID group #1 into operation for a given period of time. The RAID group to which power supply is shut off may be the RAID group #1 instead of #2. After that, the controller 11 powers on the RAID group #2 to which power supply has been shut off. The state where data read/write is executed only in the RAID group #1 (or #2) is referred to as "group split state", details of which will be described with reference to FIG. 4. After the group split state is reached, power supply to the RAID group in which data read/write is not executed is shut off.

Figure 3C:
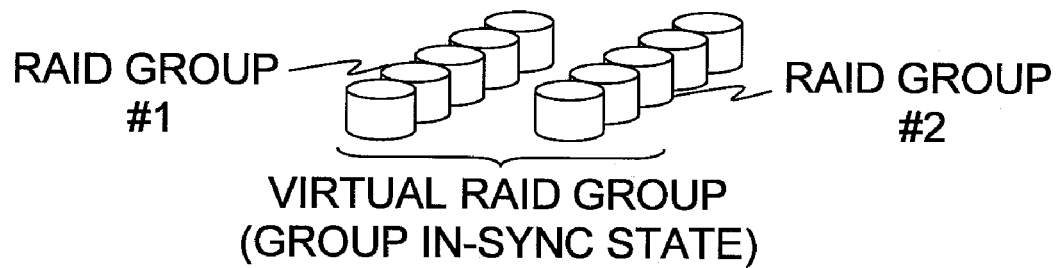
FIG. 3C is a diagram showing a state where the power of every RAID group is turned on by powering on the RAID group #2 in accordance with the first embodiment of this invention.

FIG. 3C is a diagram showing a state where the power of every RAID group 34 is turned on by powering on the RAID group #2 according to the first embodiment.

After powering on the RAID group #2 to which power supply has been shut off, the controller 11 synchronizes data in the RAID group #1 and data in the RAID group #2 with each other.

Figure 3D:
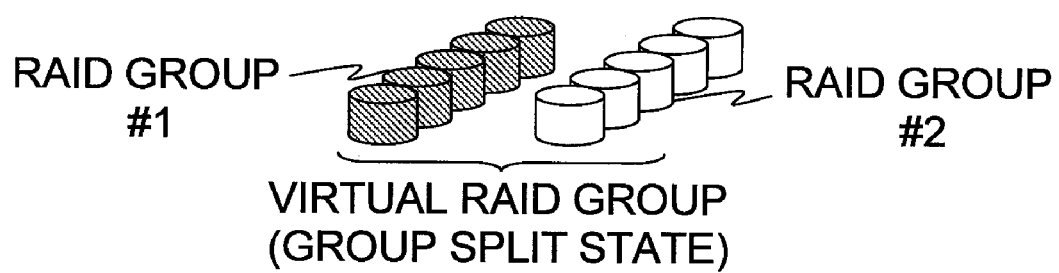
FIG. 3D is a diagram showing a state where power supply to the RAID group #1 is shut off after confirmation of the synchronization state in accordance with the first embodiment of this invention.

FIG. 3D is a diagram showing a state where power supply to the RAID group #1 is shut off after confirmation of the synchronization state according to the first embodiment. In this state, the controller 11 puts hard disks in the RAID group #2 into operation for a given period of time.

The controller 11 thereafter uses the power supply control unit 16 to control the hard disk power supply 33 such that the virtual RAID group 35 changes its state from FIG. 3A to FIG. 3B to FIG. 3C, and then to FIG. 3D.

Figure 4:
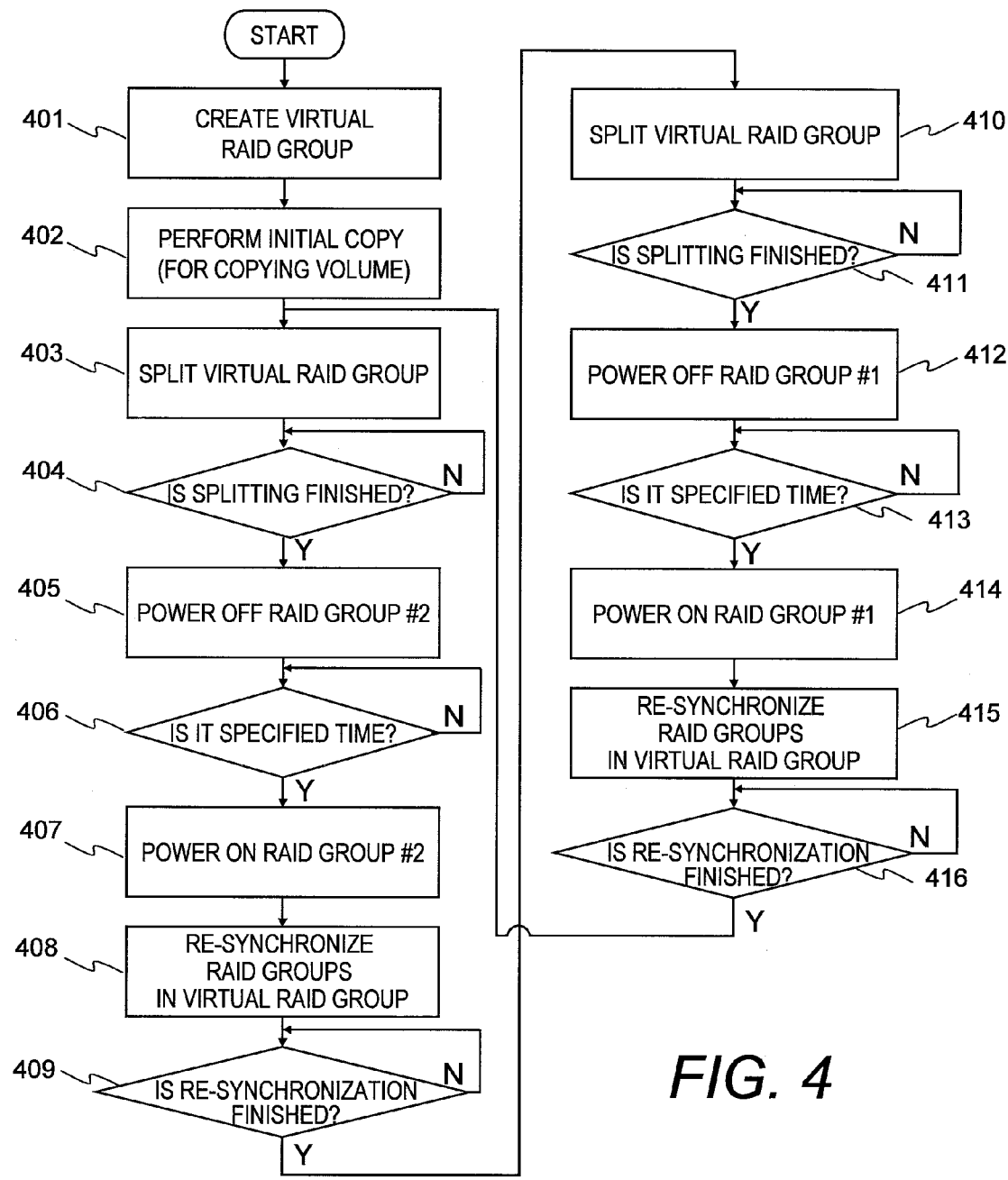
FIG. 4 is a flow chart showing a procedure of alternately powering on and off the RAID group #1 and the RAID group #2 that are included in one virtual RAID group in accordance with the first embodiment of this invention.

FIG. 4 is a flow chart showing a procedure of alternately powering on and off the RAID group #1 and the RAID group #2 that are contained in one virtual RAID group according to the first embodiment.

After the storage subsystem 1 is activated, the storage management server 2 selects two of the RAID groups 34 that the storage subsystem 1 has to create one virtual RAID group 35 (Step 401). The virtual RAID group 35 created in this embodiment is the one shown in FIG. 2.

Next, the controller 11 executes initial copy (Step 402). The initial copy is processing of copying data from one of the RAID groups #1 and #2 to the other to synchronize the RAID groups #1 and #2 with each other.

The controller 11 then starts accepting data read/write requests from the computer 3. At this point, the power is on in both the RAID groups #1 and #2. Upon reception of a write request, requested data is written in duplicate in the two RAID groups #1 and #2 that are contained in the virtual RAID group 35 in order to keep the RAID groups #1 and #2 synchronized.

The controller 11 next splits the virtual RAID group 35 (Step 403). To make only one of the two RAID groups 34 (here, the RAID group #1) accessible to the computer 3, the controller 11 associates the virtual RAID group 35 with the address space of the RAID group #1. The controller 11 also starts recording an address in the virtual RAID group 35 at which data is newly written and an address in the virtual RAID group 35 at which data is updated. An address at which data is updated is recorded with the use of, for example, a bit map that corresponds to the address space. The series of these processing steps is called virtual RAID group splitting.

The controller 11 stands by until the virtual RAID group splitting is completed (the result of Step 404 is "N"). When the virtual RAID group splitting is completed (the result of Step 404 is "Y"), the controller 11 shuts off power supply to the other RAID group (here, the RAID group #2) (Step 405).

The controller 11 keeps one of the two RAID groups powered on and the other RAID group powered off until a specified time (Step 406). The specified time is set based on the data synchronization start time in the power supply control management information 22 an example of which is shown in FIG. 5.

When the specified time arrives (the result of Step 406 is "Y"), the controller 11 powers on the RAID group #2 to which power supply has been shut off (Step 407). In the case where a write request is received after Step 407, the controller 11 writes requested data in duplicate in the two RAID groups #1 and #2 that are contained in the virtual RAID group 35 in order to keep the RAID groups #1 and #2 synchronized. The controller 11 then consults the record of addresses at which data has been changed while power supply to the RAID group #2 has been shut off to copy only changed data from the RAID group #1 to the RAID group #2, thereby re-synchronizing the RAID groups #1 and #2 and putting the virtual RAID group 35 into the group in-sync state again (Step 408).

After the re-synchronization of the RAID groups #1 and #2 is completed (the result of Step 409 is "Y"), the controller 11 splits the virtual RAID group 35. To make data read or written only in the RAID group #2, the controller 11 associates the virtual RAID group 35 with the address space of the RAID group #2. The controller 11 also starts recording an address in the virtual RAID group 35 at which data is newly written and an address in the virtual RAID group 35 at which data is updated (Step 410).

After the splitting of the virtual RAID group 35 is completed (the result of Step 411 is "Y"), the controller 11 shuts off power supply to the RAID group #1 (Step 412).

Now referring back to FIG. 5, the power on/off switching time is set to "30 minutes after the data synchronization start time". The power on/off switching time is set to a time a given period past the data synchronization start time because it takes some time until data synchronization is completed and power supply to one of the two RAID groups is shut off since the data synchronization is started.

In the case where the above processing takes 30 minutes or longer, the controller 11 extends the power on/off switching time to a time when the data synchronization is actually completed. In the case where the data synchronization is completed in less than 30 minutes, the power on/off status may be switched at that point. Instead of setting the power on/off switching time, the power on/off status may be switched as soon as the data synchronization is completed.

As shown in FIG. 5, different data synchronization start times are set to different virtual RAID groups 35 in order to avoid executing the data synchronization processing simultaneously in multiple virtual RAID groups 35. If the processing of synchronizing data is executed in many virtual RAID groups 35 at once, data copy processing is executed between numerous RAID groups, which increases the load on the controller 11, degrades the ability of the controller 11 to process processing requests made by the computer 3, and lowers the performance. It is therefore desirable to set the data synchronization start time in a manner that avoids executing data synchronization simultaneously in multiple virtual RAID groups 35.

As in Step 406, the controller 11 keeps one of the two RAID groups powered on and the other RAID group powered off until a specified time (Step 413).

When the next data synchronization start time arrives, the controller 11 powers on the RAID group #1 to which power supply has been shut off (Step 414). In the case where a write request is received after Step 414, the controller 11 writes data in duplicate in the two RAID groups #1 and #2 that are contained in the virtual RAID group 35 in order to keep the RAID groups #1 and #2 synchronized. The controller 11 then consults the record of addresses at which data has been changed while power supply to the RAID group #1 has been shut off to copy only added or changed data from the RAID group #2 to the RAID group #1, thereby re-synchronizing the RAID groups #1 and #2 and putting the virtual RAID group 35 into the group in-sync state again (Step 415).

After the re-synchronization of the RAID groups #1 and #2 is completed (the result of Step 416 is "Y"), the controller 11 splits the virtual RAID group 35 (Step 403), and repeats Steps 403 to 416.

According to the first embodiment, the operation time of each hard disk is shortened by alternately putting the RAID groups 34 that are contained in one virtual RAID group 35 into operation. With the hard disk operation time thus cut short, the lifespan and MTBF of the SATA hard disk can be prolonged and the SATA hard disk can be employed for a dominant number of hard disks in an enterprise storage system. As a result, an inexpensive enterprise storage system can be provided.

The first embodiment describes a procedure executed when each virtual RAID group 35 contains two RAID groups 34, but the number of RAID groups 34 contained in each virtual RAID group 35 (RAID group count) may be three or more. When the RAID group count is three or more, the processing of Steps 403 to 409 is repeated as many times as the RAID group count to synchronize data in every RAID group 34 in the virtual RAID group 35 that has been powered off with data in the rest of the RAID groups 34 in the virtual RAID group 35 which have been powered on. This applies to the subsequent embodiments.

The first embodiment describes a mode in which the hard disk operation time is shortened by controlling the operation time of the individual hard disks 32. Alternatively, the hard disks 32 in the first embodiment may be hard disks that can operate at a varying rpm so that the power supply control unit 16 controls the hard disks' rpm in addition to power on/off status. Employing hard disks capable of operating at a varying rpm as the hard disks 32 makes it possible to provide an inexpensive enterprise storage system that is equipped with SATA hard disks controlled in performance degradation.

In the first embodiment, when receiving a write request during a time period between the start of data synchronization in the RAID groups #1 and #2 and the completion of virtual RAID group splitting, the controller 11 writes requested data in duplicate in the RAID groups #1 and #2. Replacing this duplicate write processing with processing described below does not cause a problem in carrying out the first embodiment.

The controller 11 associates the virtual RAID group 35 with the address space of one of the RAID groups #1 and #2 to make only this RAID group accessible during a time period between the start of data synchronization in the RAID groups #1 and #2 and the completion of virtual RAID group splitting. Specifically, the controller 11 associates the virtual RAID group 35 with the address space of the RAID group #1 alone after the initial copy in Step 402 is completed and reception of access requests from the computer 3 is started, or after the RAID group #1 to which power supply has been shut off is powered on in Step 414. Similarly, the controller 11 associates the virtual RAID group 35 with the address space of the RAID group #2 alone after the RAID group #2 to which power supply has been shut off is powered on in Step 407.

In order to avoid data inconsistency, the controller 11 records an address at which data is newly written and an address at which data is updated in a second data-updated address record separate from a first data-updated address record, which has been used to record data-updated addresses prior to this processing.

After that, in Step 408 or 415, the controller 11 consults the first data-updated address record to copy only data that has been changed while one of the RAID groups has been powered off to the other RAID group. When a write request is received from the computer 3 during the copying, the controller 11 refers to the first data-updated address record to judge whether or not the write request is for an address at which data has been updated. In the case where the write request requests a further data update at an address where data has already been updated, the controller 11 copies the updated data from the copy source RAID group to the copy destination RAID group and then writes requested data in the copy destination RAID group.

When a read request is received from the computer 3 during the copying, the controller 11 refers to the first data-updated address record to judge whether or not the read request is for an address at which data has been updated. In the case where updated data is to be read, the controller 11 copies the updated data from the copy source RAID group to the copy destination RAID group and reads the requested data at the corresponding address in the copy destination RAID group.

By executing the above processing instead of the processing of writing in duplicate in the RAID groups 34, the controller 11 can reduce the lowering of access performance in processing access requests made by the computer 3 during the processing of synchronizing the RAID groups 34 with each other.

<First Modification Example of the First Embodiment>

Figure 6:
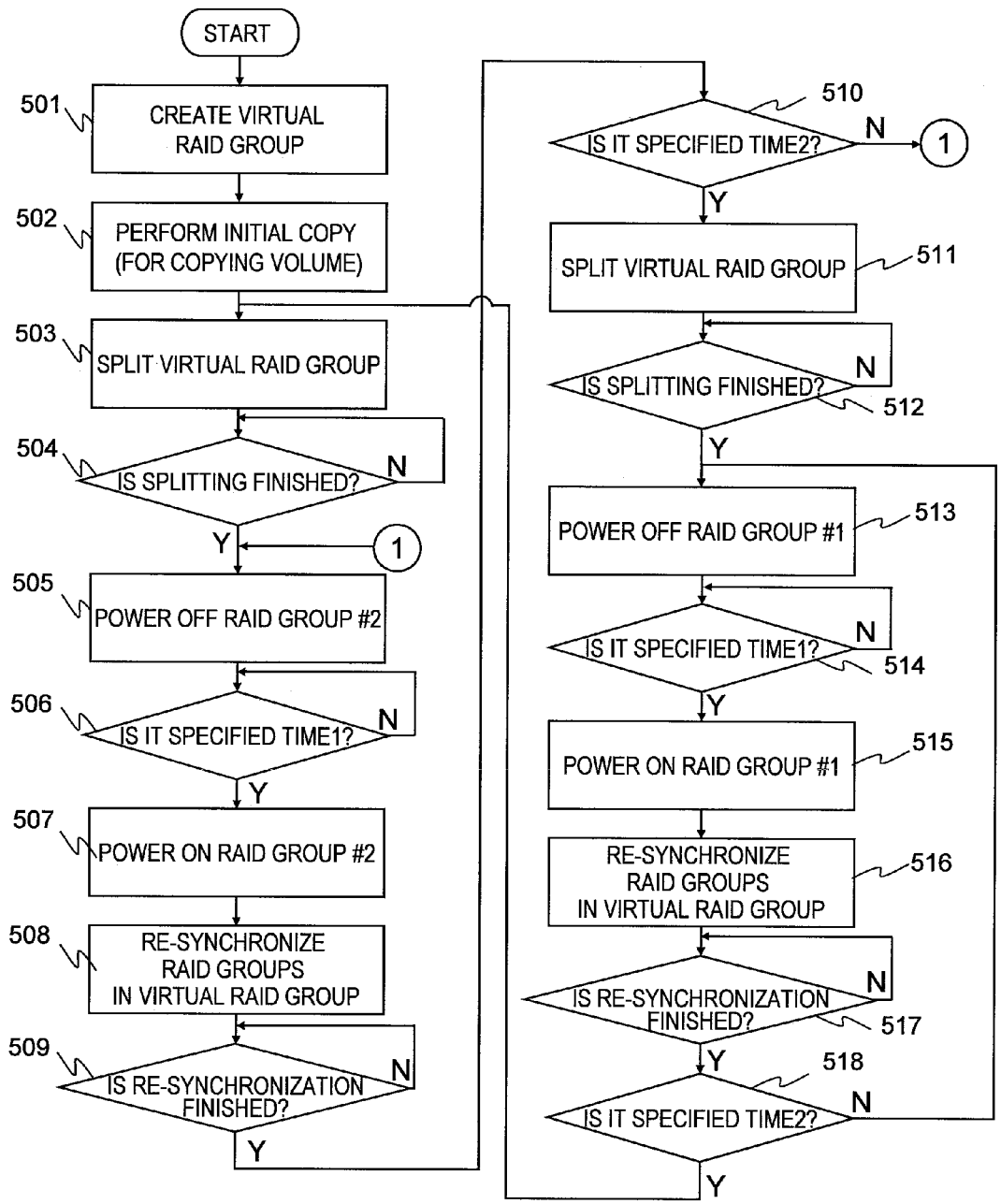
FIG. 6 is a flow chart showing a procedure of synchronizing data multiple times before one of the RAID group that has been powered on is powered off and the other RAID group that has been powered off is powered on in accordance with the first embodiment of this invention.

FIG. 6 is a flow chart showing a procedure of synchronizing data multiple times before one of the RAID groups 34 in one virtual RAID group 35 that has been powered on is powered off and the other RAID group 34 which has been powered off is powered on according to the first embodiment.

The procedure shown in FIG. 6 is basically the same as the one shown in FIG. 4 except that in FIG. 6, there are different types of specified time for synchronizing data. Specifically, two types of specified time, that is, a time at which data is synchronized (specified time 1) and a time at which the power is turned on or off (specified time 2), are set.

FIG. 7 is a diagram showing a RAID group-data synchronization start time/power switching time association table 210, which is used in the case where data is to be synchronized multiple times before one of the RAID groups 34 in one virtual RAID group 35 that has been powered on is powered off and the other RAID group 34 which has been powered off is powered on according to the first embodiment. FIG. 7 corresponds to the flow chart of FIG. 6, and shows an example in which data is synchronized twice before one of the RAID groups 34 that has been powered on is powered off and the other RAID group 34 which has been powered off is powered on.

Processing of Steps 501 to 509 in the flow chart of FIG. 6 is the same as the processing of Steps 401 to 409 in FIG. 4.

A first difference of the procedure shown in FIG. 6 from the one shown in FIG. 4 is that, after re-synchronization of the RAID groups #1 and #2 contained in the virtual RAID group 35 is completed (Step 509), the controller 11 executes processing of judging whether or not the specified time 2 arrives before the next specified time 1 (Step 510).

To give a specific description taking a virtual RAID group #0 in FIG. 7 as an example, if the specified time 1 in Step 506 is 06:00, the next specified time 1 is 12:00 and the specified time 2 is 12:30. This is a case where the specified time 2 (12:30) does not arrive before the next specified time 1 (12:00).

If the specified time 1 in Step 506 is 12:00, the next specified time 1 is 18:00 and the specified time 2 is 12:30. This is a case where the specified time 2 (12:30) arrives before the next specified time 1 (18:00).

In the case where the specified time 2 does not arrive before the next specified time 1, (the result of Step 510 is "N"), the controller 11 returns to the processing of Step 505. In the case where the specified time 2 arrives before the next specified time 1 (the result of Step 510 is "Y"), the controller 11 performs virtual RAID group splitting (Step 511). The processing of Steps 511 to 517 is the same as the processing of Steps 410 to 416 shown in FIG. 4.

A second difference of the procedure shown in FIG. 6 from the one shown in FIG. 4 is that, after data re-synchronization of the RAID groups #1 and #2 is completed (Step 517), the controller 11 executes processing of judging whether or not the specified time 2 arrives before the next specified time 1 (Step 518). The processing executed in Step 518 is the same as the one executed in Step 510. In the case where the specified time 2 arrives before the next specified time 1 (the result of Step 518 is "Y"), Step 503 is executed and the processing of Steps 503 to 518 is repeated as in the procedure of FIG. 4.

The controller 11 needs to synchronize the RAID groups #1 and #2 with each other before turning on or off the power of the RAID groups #1 and #2. In addition, it takes some time until data synchronization is completed and power supply to one of the two RAID groups is shut off since the data synchronization is started. The data synchronization start time is therefore set to a time 30 minutes prior to the power on/off switching time as shown in FIG. 7.

In the case where the preparatory processing (data synchronization) for power on/off switching takes 30 minutes or longer, switching of the power on/off status is postponed until the preparatory processing is completed. In the case where the data synchronization is completed in less than 30 minutes, the power on/off status may be switched at that point.

In FIG. 7, as in FIG. 5, different data synchronization start times are set to different virtual RAID groups 35 in order to avoid executing data synchronization processing simultaneously in multiple virtual RAID groups 35.

Synchronizing data multiple times before one of the RAID groups 34 in one virtual RAID group 35 that has been powered on is powered off and the other RAID group 34 which has been powered off is powered on as described with reference to FIG. 6 and FIG. 7 makes it possible to reduce the amount of data updated per synchronization processing. The time necessary to perform data synchronization once can therefore be cut short.

In hard disks, an upper limit is set to the number of times the hard disks are powered on or off, and the failure rate rises when the power is turned on or off more times than the upper limit. As the number of times the power has been turned on or off approaches the upper limit, a need arises to avoid exceeding the upper limit by, for example, setting a longer interval for turning the power on or off. Methods of synchronizing data without turning the power on or off are effective in cases where the interval of turning the power on or off needs to be set longer.

In the procedure shown in the flow chart of FIG. 6, too, the hard disks 32 can be the aforementioned hard disks capable of operating at a varying rpm. The power supply control unit 16 in this case has a function of controlling the rpm in addition to the function of powering the hard disks 32 on or off as described above.

<Second Modification Example of the First Embodiment>

The first embodiment describes a storage system that uses inexpensive HDDs. Another modification example of the first embodiment deals with a storage system that uses a smaller number of high-performance and reliable hard disks in addition to inexpensive HDDs. The high-performance and reliable hard disks in the following description of the second modification example of the first embodiment are FC-HDDs.

The storage system according to the second modification example of the first embodiment is equipped with one or more RAID groups that are composed of FC-HDDs. The RAID group 34 that is composed of FC-HDDs does not need to constitute a specific virtual RAID group 35.

At the time the power on/off status is switched, a RAID group composed of FC-HDDs is allocated to one virtual RAID group 35 in place of one of the RAID groups 34 in this virtual RAID group 35 that has been powered off and that is to be powered on next. When the RAID group composed of FC-HDDs is allocated to the virtual RAID group 35, every RAID group 34 contained in this virtual RAID group 35 is powered off.

For each virtual RAID group 35, whether to allocate the RAID group 34 that is composed of FC-HDDs to the virtual RAID group 35 at the time the power on/off status is switched in the virtual RAID group 35 is judged from whether or not the power on/off switching count of the virtual RAID group 35 has exceeded a preset value. In other words, the RAID group 34 that is composed of FC-HDDs is allocated to the virtual RAID group 35 whenever power on/off switching is executed a preset number of times.

The RAID group 34 that is composed of FC-HDDs is kept allocated for a given period of time, and then the controller 11 allocates the RAID group 34 that is composed of inexpensive HDDs to the virtual RAID group 35 again to continue the processing through a normal procedure.

How many times power on/off switching has been executed may be recorded for each virtual RAID group 35 so that the virtual RAID groups 35 having higher switching counts are composed of preferentially-allocated inexpensive HDDs in place of FC-HDDs. In this way, the lifespan of inexpensive HDDs constituting the RAID groups 34 can be prolonged even more.

Here, the processing of replacing inexpensive HDDs with FC-HDDs is executed after Step 507 or Step 515 of the flow chart shown in FIG. 6. In the data re-synchronization processing of Step 508 or Step 516, the controller 11 copies every piece of data in the RAID group 34 that has been powered on to the RAID group that is composed of the FC-HDDs. The same processing is executed after Step 507 or Step 515 to replace the FC-HDDs with inexpensive HDDs.

<Second Embodiment>

In a second embodiment, virtual RAID groups are divided into ones with high access frequency and ones with low access frequency so that the RAID groups 34 that constitute a low access frequency virtual RAID group are kept powered off for a longer period of time. The storage subsystem 1 in the second embodiment has the same configuration as the one described in the first embodiment with reference to FIG. 1.

Figure 8A:
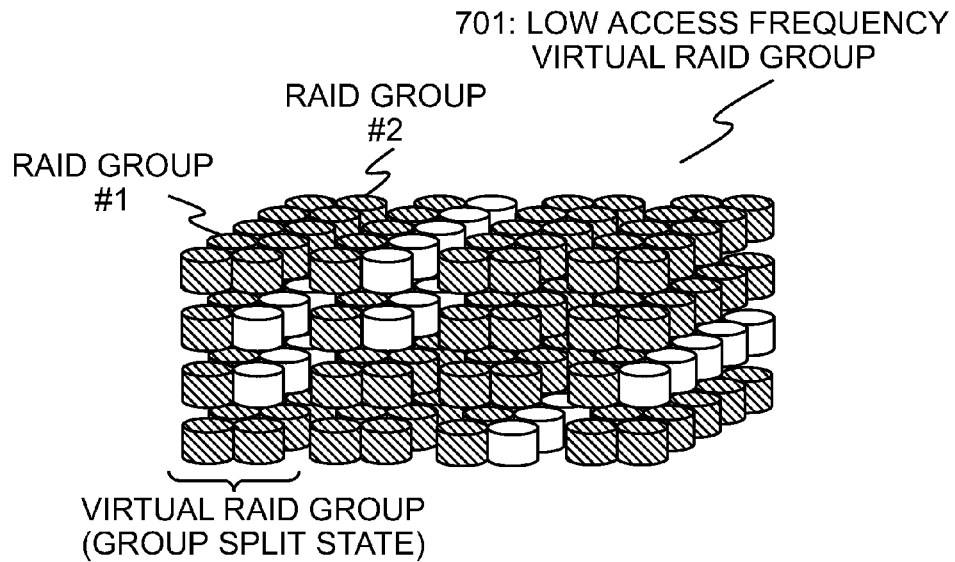
FIG. 8A is a diagram showing the power on/off status in a low access frequency virtual RAID group in accordance with a second embodiment of this invention.
Figure 8B:
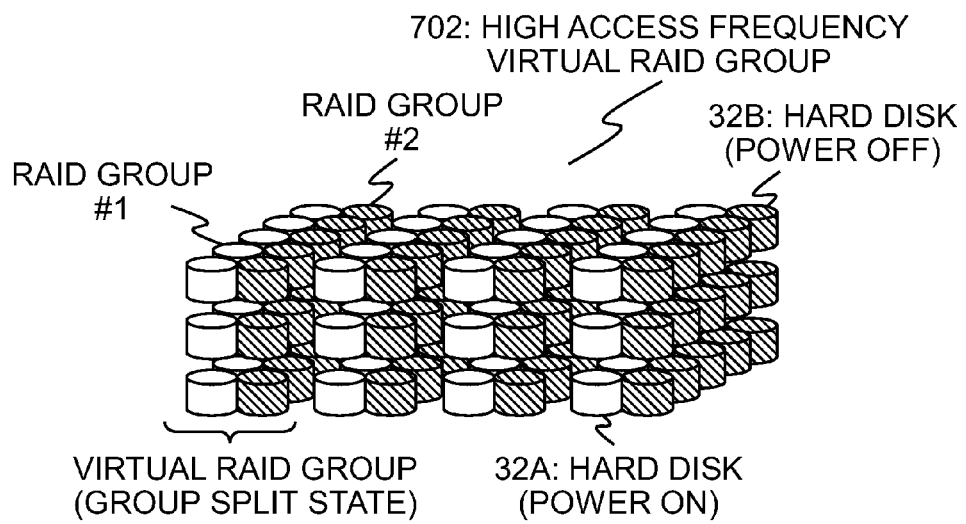
FIG. 8B is a diagram showing the power on/off status in a high access frequency virtual RAID group in accordance with the second embodiment of this invention.

FIG. 8A and FIG. 8B are diagrams showing the power status of two virtual RAID groups that have different access frequencies according to the second embodiment. In the second embodiment, a zero-access time slot is predicted for each virtual RAID group 35 from its past access history, and the virtual RAID group 35 is classified as either a member of a high access frequency virtual RAID group 702 or a member of a low access frequency virtual RAID group 701.

FIG. 8A is a diagram showing the power on/off status in a low access frequency virtual RAID group according to the second embodiment.

The low access frequency virtual RAID group 701 is a group of the virtual RAID groups 35 that have a time slot in which there is no access for a given duration of time (e.g., an hour or longer). Preferably, the given duration of time is sufficiently longer than a time required to complete data synchronization and turning on/off of the power.

The control memory 18 stores information on a zero-access time slot of the low access frequency virtual RAID group 701. The controller 11 refers to this information to shut off power supply to some of hard disks in the RAID group 34 that is powered on during a zero-access time slot specific to the virtual RAID group 35 that contains this RAID group 34.

Despite the fact that the low access frequency virtual RAID group 701 is not accessed in a zero-access time slot, the controller 11 shuts off power supply to only some of hard disks constituting the RAID group 34 during the zero-access time slot instead of shutting off power supply to every hard disk in the RAID group 34.

FIG. 8B is a diagram showing the power on/off status in a high access frequency virtual RAID group according to the second embodiment.

The high access frequency virtual RAID group 702 is a group of the virtual RAID groups 35 that do not have a time slot in which there is no access for a given duration of time. In the high access frequency virtual RAID group 702, each of its constituent virtual RAID groups 35 powers on only one of the RAID groups 34 that constitute the virtual RAID group 35. Therefore, the same control as the one described in the first embodiment is executed in the high access frequency virtual RAID group 702.

Figure 9A:
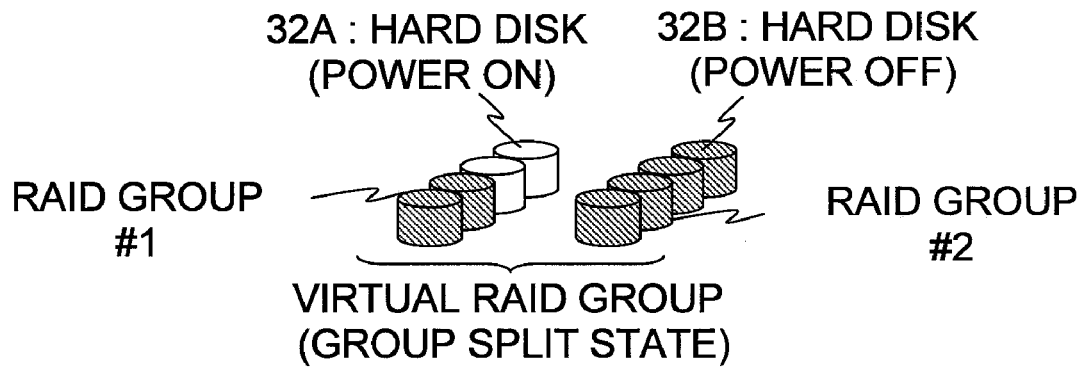
FIG. 9A is a diagram showing a state where power supply to some of hard disks that constitute a level one RAID group is shut off in accordance with the second embodiment of this invention.

FIG. 9A is a diagram showing a state where power supply to some of hard disks that constitute a level one RAID group is shut off according to the second embodiment.

A level one RAID group has data redundancy within the RAID group, and power supply is shut off to one of hard disks paired with each other for redundancy. Each RAID group 34 shown in FIG. 9A is composed of four hard disks, and two of the hard disks are respectively paired with the remaining two hard disks for data redundancy. In FIG. 9A, power supply to one hard disk pair (two hard disks) is shut off.

Since the zero-access time slot is predicted from access history, an inaccurate prediction can be made and the virtual RAID group 35 may be accessed during its zero-access zone. In the case where the access is made to deliver a data read request, requested data can be read out of a hard disk that is powered on.

In the case where the access is made to deliver a data write request, on the other hand, the controller 11 temporarily writes requested data in a hard disk that is powered on and records in the control memory 18 an address at which the data is written. The controller 11 also instructs upon reception of the data write request a hard disk that is powered off to turn the power on. When the hard disk that has been powered off is activated as instructed and becomes accessible, the data written at the recorded address is copied from the hard disk that has been powered on to the hard disk that has been powered off and is now activated.

In the case of the storage subsystem 1 of the second embodiment which has the cache memory 14 for temporary data storage in addition to hard disks, the controller 11 may store write data in the cache memory 14 first upon reception of write access. The controller 11 then instructs a hard disk that is powered off to turn the power on. When the hard disk that has been powered off is activated as instructed and becomes accessible, the write data is written in duplicate in a hard disk that has been powered on and the hard disk that has been powered off and is now activated.

Alternatively, upon reception of write access, the controller 11 may store write data in the cache memory 14, write data first in a hard disk that is powered on, and instruct a hard disk that is powered off to turn the power on. When the hard disk that has been powered off is activated as instructed and becomes accessible, the write data is written in the hard disk that has been powered off and is now activated.

Figure 9B:
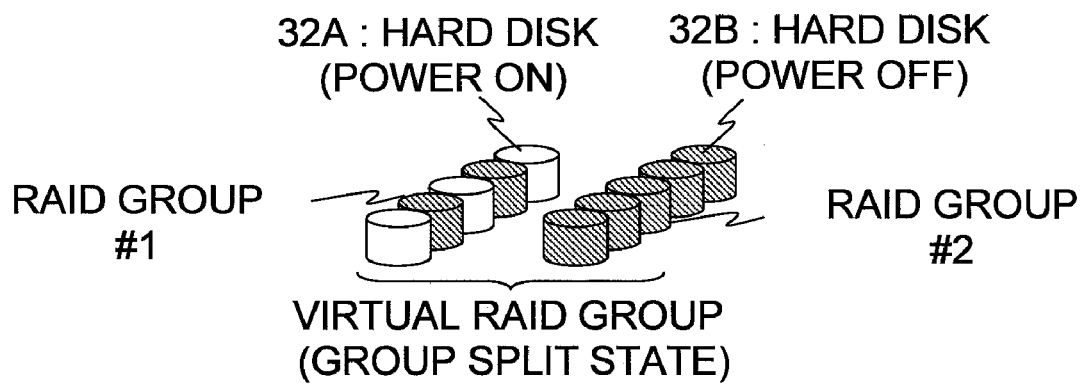
FIG. 9B is a diagram showing a state where power supply to some of hard disks that constitute a level six RAID group is shut off according to the second embodiment of this invention.

FIG. 9B is a diagram showing a state where power supply to some of hard disks that constitute a level six RAID group is shut off according to the second embodiment.

A level six RAID group stores parity in two hard disks within the RAID group, so power supply to two of hard disks in the RAID group can be shut off. Specifically, when the RAID group with two hard disks powered off is accessed for data read, requested data can be restored and read from a hard disk that is powered on.

When the access is made to deliver a data write request, on the other hand, the controller 11 stores write data in the cache memory 14 upon reception of the write request. The controller 11 then instructs a hard disk that is powered off to turn the power on. When the hard disk that has been powered off is activated as instructed and becomes accessible, the write data and parity are written in a given hard disk.

It should be noted that, though not shown in FIG. 9A and FIG. 9B, in the case of a level five RAID group which stores parity in one hard disk within the RAID group, power supply to one of hard disks in the RAID group can be shut off. Details of power supply control in the level five RAID group are the same as in the case of the level six RAID group.

Figure 10:
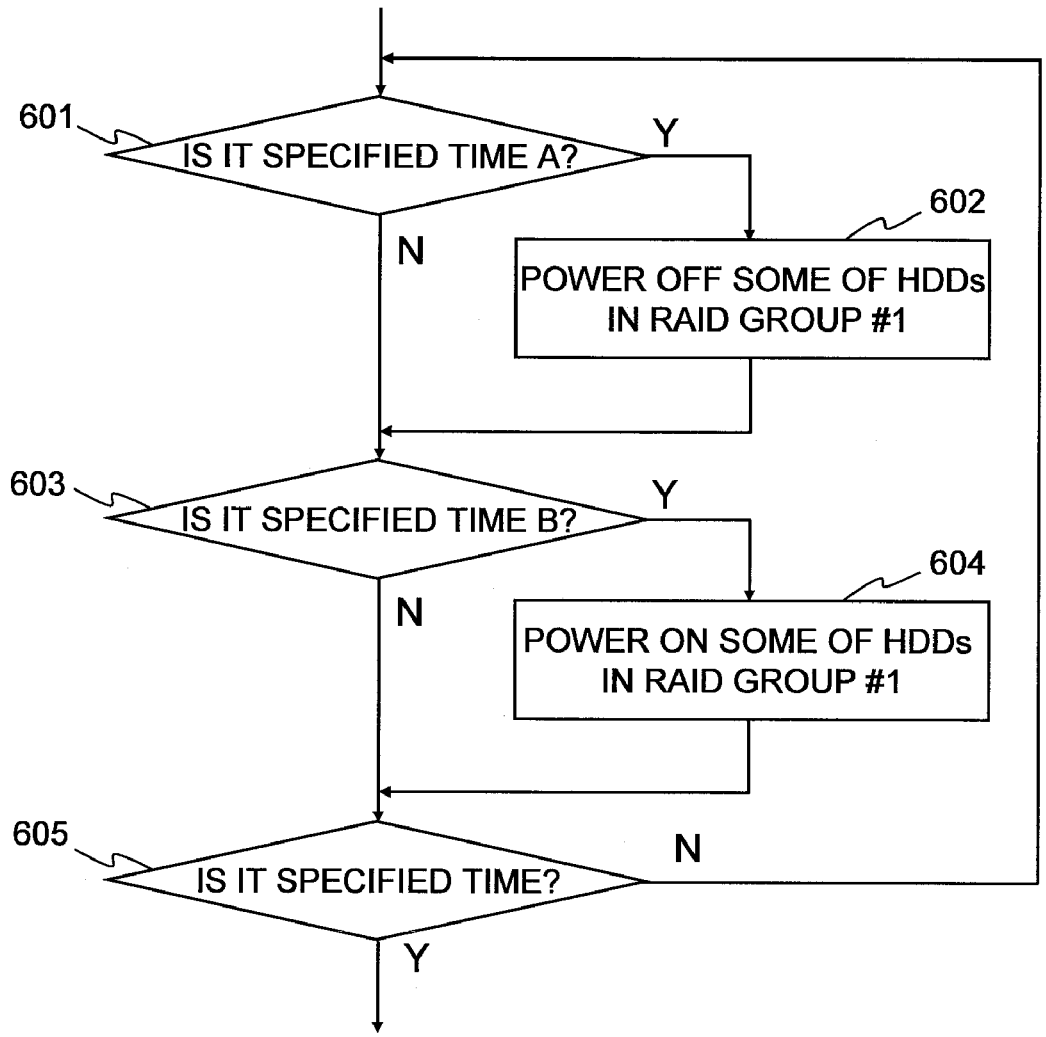
FIG. 10 is a flow chart showing a procedure of shutting off power supply to some of hard disks in a powered-on RAID group in a time slot that is predicted for each virtual RAID group in accordance with the second embodiment of this invention.

FIG. 10 is a flow chart showing a procedure of shutting off power supply to some of hard disks in a powered-on RAID group in a time slot that is predicted for each virtual RAID group according to the second embodiment. The overall power supply control procedure in the second embodiment is basically the same as in the first embodiment.

Processing of shutting off power supply to some of hard disks in a given time slot can be executed by incorporating the flow chart of FIG. 10 in the flow chart of FIG. 4. A time period between a specified time A in Step 601 and a specified time B in Step 603 corresponds to the zero-access time slot predicted from access history.

The processing of FIG. 10 is inserted between Steps 405 and 406 and between Steps 412 and 413 in FIG. 4. When the processing is inserted between Steps 412 and 413, the RAID group in the processing of Steps 602 and 604 is the RAID group #2. Similarly, the processing of FIG. 10 is inserted between Steps 505 and 506 and between Steps 513 and 514 in the flow chart of FIG. 6. When the processing is inserted between Steps 513 and 514, the RAID group in the processing of Steps 602 and 604 is the RAID group #2.

The arrival of the specified time A (the result of Step 601 is "Y") means the start of the zero-access time slot predicted from access history, so the controller 11 shuts off power supply to some of hard disks in the RAID group #1 (Step 602).

The arrival of the specified time B (the result of Step 603 is "Y") means the end of the zero-access time slot predicted from access history, so the controller 11 powers on some of hard disks in the RAID group #1 (Step 604).

According to the second embodiment, the length of time in which a hard disk is powered on can be cut even shorter than in the first embodiment. The SATA hard disk lifespan and MTBF can therefore be prolonged even more.

<Third Embodiment>

In a third embodiment, the power on/off status of a hard disk is switched based on the amount of data updated instead of switching the power on/off status of a hard disk at a specified time.

Figure 11:
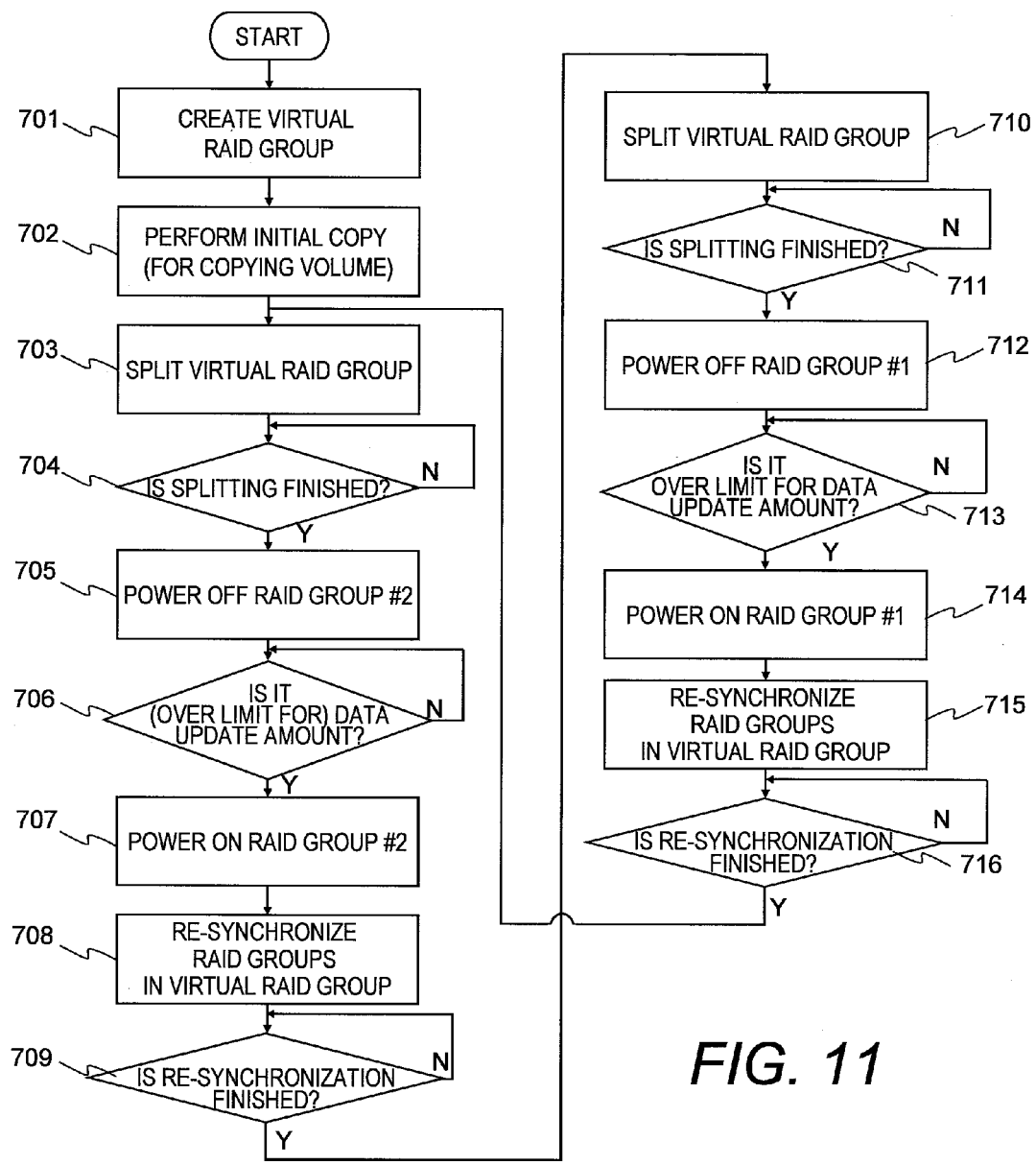
FIG. 11 is a flow chart showing a procedure of alternately powering on and off RAID groups in one virtual RAID group based on the amount of data updated while the RAID groups are powered on in accordance with a third embodiment of this invention.

FIG. 11 is a flow chart showing a procedure of alternately powering on and off RAID groups in one virtual RAID group based on the amount of data updated while the RAID groups are powered on according to the third embodiment.

In the procedure of alternately powering on and off RAID groups according to the third embodiment, judging processing that is based on the data update amount is executed in place of the judging processing in the procedure of FIG. 4 which is based on a specified time. The rest of the processing in the procedure of FIG. 11 is the same as in the procedure of FIG. 4. Specifically, all steps are common to FIG. 11 and FIG. 4 except that the processing of Steps 406 and 413 of FIG. 4 differs from processing of Steps 706 and 713 of FIG. 11.

As in the procedure of FIG. 4, the controller 11 splits the virtual RAID group 35 in Steps 703 and 710 and then starts recording an address in the virtual RAID group 35 at which data is newly written and an address in the virtual RAID group 35 at which data is updated. The controller 11 in the third embodiment also records the amount of updated data along with the updated data.

In the processing of Steps 706 and 713, the controller 11 calculates from the recorded data update amount how long it takes to copy the updated data from one of RAID groups in the virtual RAID group 35 to the rest of the RAID groups (one RAID group in the third embodiment). The average transfer rate in transferring data from one of RAID groups to the rest of the RAID groups can be estimated empirically in advance, and the length of time required for the copying (i.e., the length of time required for data synchronization) can thus be calculated from the data update amount.

When the length of time required for the copying is equal to or more than an upper limit (e.g., 30 minutes) set in advance (the result of Step 706 or 713 is "Y"), the controller 11 executes processing of Step 707 or 715. This upper limit is determined desirably from the access frequency and necessary access performance since the performance of the storage subsystem 1 in processing data read/write access that is made during data copy is affected by the copy processing.

According to the third embodiment, the time required for synchronization of RAID groups that are contained in one virtual RAID group is prevented from lengthening by determining when to turn on and off the power based on the data update amount. Accordingly, this minimizes the influence of data synchronization on the performance of the storage subsystem 1 in allowing the computer 3 to read/write data in RAID groups during the data synchronization.

The judging processing for the data update amount may be replaced with the judging processing for the specified time 1 in FIG. 6 (Steps 506 and 514). In this case, after data synchronization is performed a preset number of times, the virtual RAID group splitting processing (Steps 511 and 503) is executed skipping the judging processing for the specified time 2 (Steps 510 and 518).

<Fourth Embodiment>

In a fourth embodiment, a copy of data stored in one of two virtual RAID groups 35 is stored in the other virtual RAID group 35 and, upon external instruction, data in one virtual RAID group 35 and data in the other virtual RAID group 35 are synchronized. Specifically, one of two virtual RAID groups 35 operates as a master whereas the other operates as a slave, and a data update in the master virtual RAID group denoted by 35A is reflected in the slave virtual RAID group denoted by 35B to keep data stored in the master and data stored in the slave consistent with each other.

FIG. 12A to FIG. 12D are diagrams illustrating a procedure of controlling power supply to disk devices according to the fourth embodiment. The fourth embodiment describes a case where two virtual RAID groups 35 respectively serve as a master and a slave. However, this invention is also applicable to a case where there are three or more virtual RAID groups 35 with one of them serving as the master virtual RAID group 35A and the remaining two or more serving as the slave virtual RAID groups 35B. In the fourth embodiment, power supply to multiple RAID groups constituting each of the master virtual RAID group 35A and the slave virtual RAID group 35B is controlled in the same way as in the first to third embodiments.

The controller 11 first designates which virtual RAID group 35 serves as the master virtual RAID group 35A and which virtual RAID group 35 serves as the slave virtual RAID group 35B. Data is copied from the master virtual RAID group 35A (copy source) to the slave virtual RAID group 35B (copy destination).

Figure 12A:
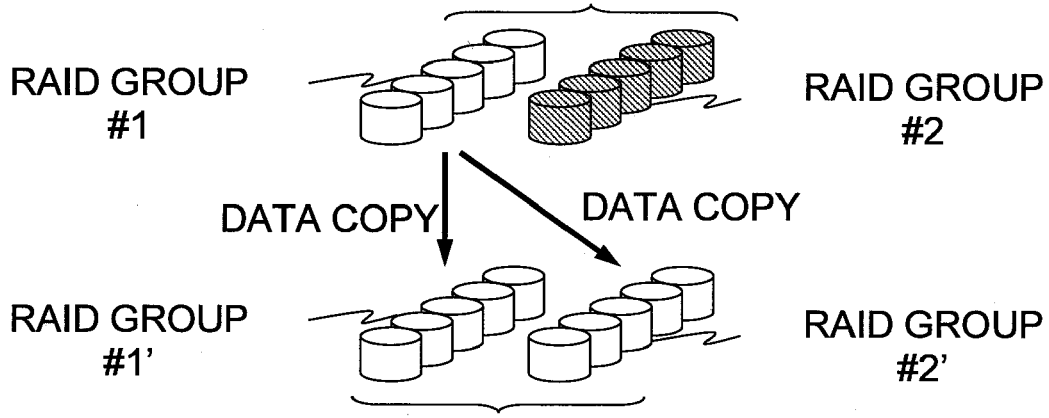
FIG. 12A is a diagram showing a case where the master virtual RAID group is in the group split state and the slave virtual RAID group is in the group in-sync state immediately after the storage subsystem is activated in accordance with a fourth embodiment of this invention.

FIG. 12A is a diagram showing a case where the master virtual RAID group 35A is in the group split state and the slave virtual RAID group 35B is in the group in-sync state immediately after the storage subsystem 1 is activated according to the fourth embodiment.

The controller 11 first copies every piece of data in the master virtual RAID group 35A to the slave virtual RAID group 35B to synchronize data in the master and data in the slave. This copying is called initial copy. Specifically, data stored in the RAID group #1 of the master virtual RAID group 35A is copied by initial copy to the RAID groups #1 and #2 that constitute the slave virtual RAID group 35B.

The controller 11 then shuts off power supply to the RAID group #2 of the slave virtual RAID group 35B.

Figure 12B:
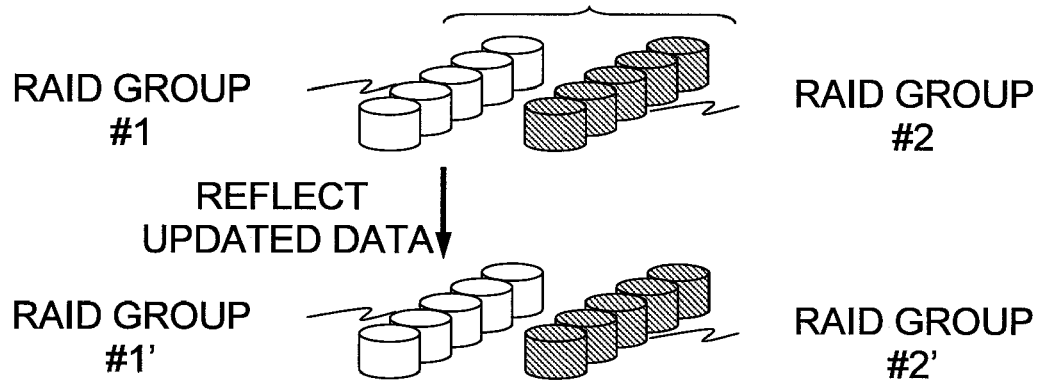
FIG. 12B is a diagram showing a case where the master virtual RAID group and the slave virtual RAID group are both in the group split state in accordance with the fourth embodiment of this invention.

FIG. 12B is a diagram showing a case where the master virtual RAID group 35A and the slave virtual RAID group 35B are both in the group split state according to the fourth embodiment.

After the initial copy is completed, each time new data is written or existing data is updated in the master virtual RAID group 35A, the controller 11 makes the data write or update reflected in the slave virtual RAID group 35B. Specifically, data write or update is mirrored from the powered-on RAID group #1 of the master virtual RAID group 35A to the powered-on RAID group #1 of the slave virtual RAID group 35B.

In the case where the controller 11 gives an instruction after the state shown in FIG. 12B to suspend synchronization of the master virtual RAID group 35A and the slave virtual RAID group 35B, mirroring of updated data to the slave virtual RAID group 35B is stopped (not shown). The controller 11 then records in the control memory 18 only an address at which data is written or updated when a request to write new data in the master virtual RAID group 35A or a request to update data in the master virtual RAID group 35A is received. After that, upon instruction to resume synchronization of the virtual RAID groups 35A and 35B again, addresses recorded in the control memory 18 while the synchronization is suspended are used to make the data write or update reflected in the slave virtual RAID group 35B.

Figure 12C:
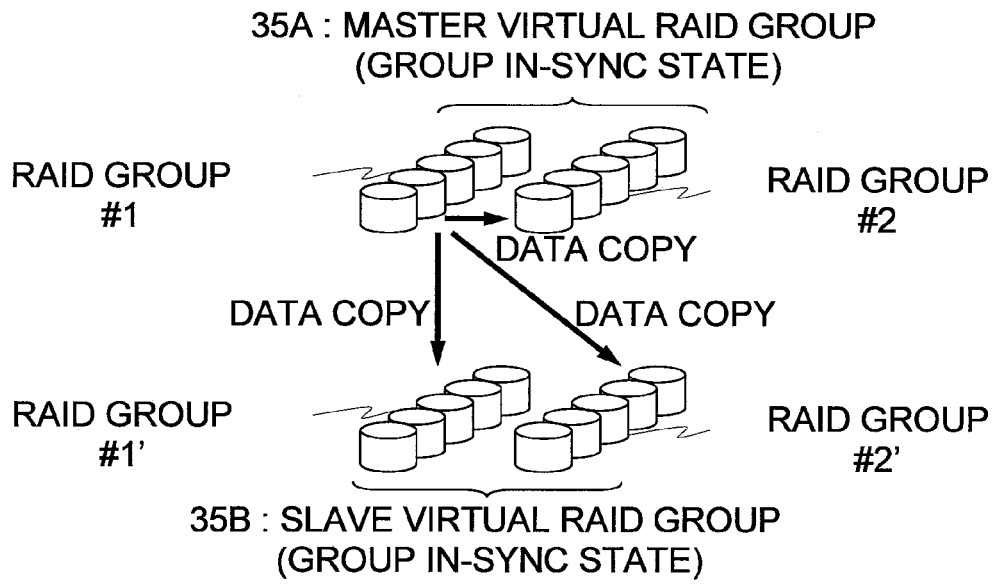
FIG. 12C is a diagram showing a case where the master virtual RAID group and the slave virtual RAID group are both in the group in-sync state in accordance with the fourth embodiment of this invention.

FIG. 12C is a diagram showing a case where the master virtual RAID group 35A and the slave virtual RAID group 35B are both in the group in-sync state according to the fourth embodiment.

In switching the power on/off status of the RAID groups 34 in the master virtual RAID group 35A, the controller 11 powers on every RAID group 34 in the master virtual RAID group 35A and in the slave virtual RAID group 35B. The controller 11 then makes data in the RAID group 34 of the master virtual RAID group 35A that has been powered on reflected in the RAID group 34 that has been powered off.

In the case where the master virtual RAID group 35A and the slave virtual RAID group 35B are in the group split state at this point, the controller 11 uses the data-updated address record kept in the control memory 18 to make data write and update reflected in the RAID group 34 of the slave virtual RAID group 35B that has been powered on.

After synchronization is completed in all the RAID groups 34, the controller 11 puts the master virtual RAID group 35A and the slave virtual RAID group 35B into the group split state, powers on one of the RAID groups 34 in each of the virtual RAID groups 35A and 35B, and powers off the other RAID group 34.

Figure 12D:
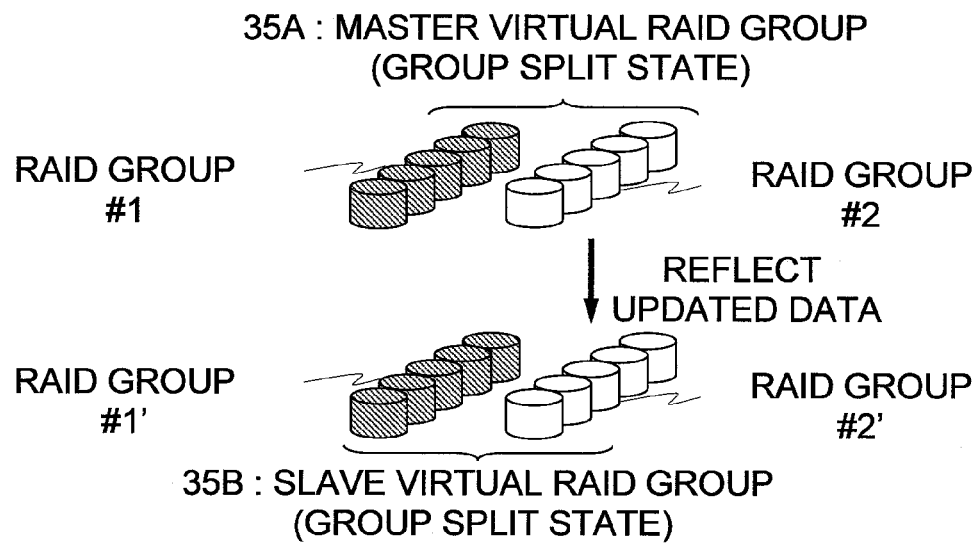
FIG. 12D is a diagram showing a case where the master virtual RAID group and the slave virtual RAID group are in the group split state in accordance with the second embodiment of this invention.

FIG. 12D is a diagram showing a case where the master virtual RAID group 35A and the slave virtual RAID group 35B are in the group split state according to the fourth embodiment. The state shown in FIG. 12D is a state after the processing described with reference to FIG. 12C is completed.

Each time data is written or updated in the master virtual RAID group 35A, the controller 11 makes the data write or update reflected in the slave virtual RAID group 35B. Specifically, the changed data is copied from the RAID group 34 in the master virtual RAID group 35A that is powered on to the RAID group 34 in the slave virtual RAID group 35B that is powered on.

After that, whenever the power on/off status of the RAID groups 34 in the master virtual RAID group 35A is switched, the controller 11 repeats the procedures of FIG. 12C and FIG. 12D.

According to the fourth embodiment, data can be copied between multiple virtual RAID groups. Accordingly, this makes it possible to use inexpensive HDDs in a storage subsystem that provides the replication function described in the fourth embodiment.

While the present invention has been described in detail and pictorially in the accompanying drawings, the present invention is not limited to such detail but covers various obvious modifications and equivalent arrangements, which fall within the purview of the appended claims.

What is claimed is:

1. A storage subsystem coupled to a computer, comprising:
 a storage unit containing multiple disk groups, each of the multiple disk groups comprising at least one disk drive; and
 a control device for controlling data read from or written to the storage unit,
 wherein the multiple disk groups include a first disk group and a second disk group, each of the first disk group and the second disk group comprising at least one first type disk drive, and a third disk group comprising at least one second type disk drive that is more durable than the first type disk drive,
 wherein the control device includes an interface that is connected to the computer, an interface that is connected to the at least one disk drive, a cache memory for temporarily storing the data read from or written to the at least one disk drive, a power controller for controlling power supply to the multiple disk groups, and information regarding an association between address space of the disk groups and address space of a plurality of virtual disk groups, and
 wherein the control device is configured to:
 when a state of one disk group of the first disk group and the second disk group is a power-off state, a state of the other disk group is a power-on state, and address space of the other disk group is allocated to a virtual disk group to make the other disk group accessible, turn on power of the one disk group;
 write to the one disk group, the data that is stored to the other disk group;
 put the other disk group into the power-off state;
 change allocation of the address space of the other disk group, which is allocated to the virtual disk group, by allocating address space of the one disk group to the virtual disk group to make the one disk group accessible, based on the information regarding the association between the address space of the disk groups and the address space of the virtual disk groups;
 count a number of times the address space allocated to the virtual disk group changes;
 when the control device receives requests to read data from or write data to the virtual disk group, execute the requests using the first disk group when the first disk group is in the power-on state and the second disk group is in the power-off state, and execute the requests using the second disk group when the first disk group is in the power-off state and the second disk group is in the power-on state;

when the first disk group is the power-on state, the second disk group and the third disk group are the power-off state, and the number exceeds a predetermined number at the predetermined first timing when a power state of the first disk group is changed from the power-on state to the power-off state, put the third disk group into the power-on state, write to the third disk group, the data that is stored to the first disk group;

put the first disk group into the power-off state after writing to the third disk group; and allocate address space of the third disk group to the virtual disk group to make the third disk group accessible; and when the control device receives requests of data reading from or writing to the virtual disk group, reading from or writing to the third disk group.

2. The storage subsystem according to claim 1, wherein the control device is further configured to:

when the number does not exceed a predetermined number at the predetermined first timing, put the second disk group into the power-on state, write to the second disk group, the data that was stored to the first disk group while the second disk group was in the power-off state;

put the first disk group into the power-off state after writing to the second disk group; and when the control device receives requests of data reading from or writing to the virtual disk group, reading from or writing to the second disk group.

3. The storage subsystem according to claim 1, wherein the control device is further configured to:

record a data size of data written to the first disk group; and write the data written to the first disk group to the third disk group that is put Into the power-on state at the predetermined first timing when the recorded data size exceeds a predetermined size.

4. The storage subsystem according to claim 2, wherein the control device is further configured to:

record addresses where data was written to the first disk group while the third disk group was in the power-off state; and when writing the data that was written to the first disk group to the second disk group that is put into the power-on state at the predetermined first timing, write only data that is stored at the recorded addresses.

5. The storage subsystem according to claim 2, wherein the control device is further configured to:

turn on the power of the second disk group that is the power-off state at a predetermined second timing that comes before at least once before the predetermined first timing;

write data that was written to the first disk group while the second disk group was in the power-off state to the second disk group that is put into the power-on state at the predetermined second timing; and shut off power supply to the second disk group again after writing to the second disk group that is put into the power-on state at the predetermined second timing.

6. The storage subsystem according to claim 1, wherein the control device is further configured to:

record a time at which the computer makes a request to read data or write data;

predict a time period during which no data read or write request is received; and shut off power supply to some disk drives in the first disk group or the third disk group that is in the power-on state during the time period in which no data read or write request is received for a predetermined length of time or longer.

7. The storage subsystem according to claim 6, wherein each disk drive in each of the disk groups stores parity of data that is stored in the disk drive, and wherein the control device is further configured to shut off power supply to as many disk drives as determined from a number of parity that is contained in the first disk group or the third disk group.

8. The storage subsystem according to claim 6, wherein each of the disk groups contains at least two disk drives, wherein each of the at least two disk drives in each of the disk groups stores data in a manner that provides redundancy, and wherein the control device is further configured to, during the time period, shut off power supply to one of the at least two disk drives storing the redundant data in the first disk group or the third disk group that is in the power-on state.

9. A computer system, comprising;

a computer;

a storage subsystem coupled to the computer, and a management server for managing the storage subsystem, wherein the storage subsystem includes a storage unit and a control device, the storage unit having multiple disk groups, each of the multiple disk groups comprising at least one disk drive, the control device for controlling data read from or written to the storage unit, wherein the multiple disk groups include a first disk group and a second disk group each of which comprises at least one first type disk drive, and a third disk group comprising at least one second type disk drive that is more durable than the first type disk drive, wherein the control device includes an interface that Is connected to the computer, an interface that is connected to the at least one disk drive, a cache memory for temporarily storing the data read from or written to the at least one disk drive, a power controller for controlling power supply to the multiple disk groups, and information regarding an association between address space of the disk groups and address space of a plurality of virtual disk groups, and wherein the control device is configured to:

configure a virtual disk group that provides memory area to read data or write data by allocating address space of the disk group, when a state of one disk group of the first disk group and the second disk group is a power-off state, a state of the other disk group is a power-on stale, and address space of the other disk group is allocated to the virtual disk group to make the other disk group accessible, turn on power of the one disk group;

write to the one disk group, the data that is stored to the other disk group;

put the other disk group into the power-off state;

change allocation of the address space of the other disk group, which is allocated to the virtual disk group, by allocating address space of the one disk group to the virtual disk group to make the one disk group accessible, based on the information regarding the association between the address space of the disk groups and the address space of the virtual disk groups;

count a number of times the address space allocated to the virtual disk group changes, wherein the management server stores power supply control management information, which is used to control the power controller and contains a first timing at which the first disk group is changed from a power-on state to the power-off state when the first disk group is the power-on state, the second disk group and the third disk group are the power-off state, and wherein the control device is configured to:
when the number exceeds a predetermined number at the predetermined first timing, put the third disk group into the power-on state, write to the third disk group, the data that is stored to the first disk group;
put the first disk group into the power-off state after writing to the third disk group; and
when the control device receives requests of data reading from or writing to the virtual disk group, reading from or writing to the third disk group.

10. The computer system according to claim 9, wherein the control device is further configured to:
when the number does not exceed a predetermined number at the first timing, put the second disk group into the power-on state, write to the second disk group, the data that was stored to the first disk group while the second disk group was in the power-off state,
put the first disk group Into the power-off state after writing to the second disk group;
when the control device receives requests of data reading from or writing to the virtual disk group, reading from or writing to the second disk group.

11. The computer system according to claim 9, wherein the control device is further configured to:
record a data size of data written to the first disk group; and
write the data written to the first disk group to the third disk group that is put into the power-on state at the first timing when the recorded data size exceeds a predetermined size.

12. The computer system according to claim 10, wherein the power supply control management information contains a second timing that comes before at least once before the first timing, and
wherein the control device is further configured to:
turn on the power of the second disk group that is the power-off state at a second timing;
write data that was written to the first disk group while the second disk group was in the power-off state to the second disk group that is put into the power-on state at the second timing; and
shut off power supply to the second disk group again after writing to the second disk group that is put into the power-on state at the second timing.

13. A method of controlling power supply to disk drives installed in a storage subsystem coupled to a computer, the storage subsystem including a storage unit containing multiple disk groups, each of the multiple disk groups comprising at least one disk drive, a control device for controlling data read from or written to the storage unit, wherein the multiple disk groups include a first disk group and a second disk group each of which comprises at least one first type disk drive, and a third disk group comprising at least one second type disk drive that is more durable than the first type disk drive, wherein the control device includes an interface that is connected to the computer, an interface that is connected to the at least one disk drive, a cache memory for temporarily storing the data read from or written to the at least one disk drive, a power controller for controlling power supply to the multiple disk groups, and information regarding an association between address space of the disk groups and address space of a plurality of virtual disk groups, and the method comprising:
when a state of one disk group of the first disk group and the second disk group is a power-off state, a state of the other disk group is a power-on state, and address space of the other disk group is allocated to a virtual disk group to make the other disk group accessible, turning on power of the one disk group;
writing to the one disk group, the data that is stored to the other disk group;
putting the other disk group into the power-off state;
changing allocation of the address space of the other disk group, which is allocated to the virtual disk group, by allocating address space of the one disk group to the virtual disk group to make the one disk group accessible;
counting a number of times the address space allocated to the virtual disk group changes;
when the control device receives requests to read data from or write data to the virtual disk group, execute the requests using the first disk group when the first disk croup is in the power-on state and the second disk group is in the power-off state, and execute the requests using the second disk group when the first disk group is in the power-off state and the second disk group is in the power-on state;
when the first disk group is a power-on state, the second disk group and the third disk group are the power-off state, and the number exceeds a predetermined number at the predetermined first timing when a power state of the first disk group is changed from the power-on state to the power-off state, putting the third disk group into the power-on state, and writing to the third disk group, the data that is stored to the first disk group;
putting the first disk group into the power-off state after writing to the third disk group;
allocating address space of the third disk group to the virtual disk group to make the third disk group accessible; and
when the control device receives requests of data reading from or writing to the virtual disk group, reading from or writing to the third disk group.

14. The method according to claim 13, further comprising;
when the number does not exceed a predetermined number at the predetermined first timing, putting the second disk group into the power-on state;
writing to the second disk group, the data that was stored to the first disk group while the second disk group was in the power-off state;
putting the first disk group into the power-off state after writing to the second disk group; and
when the control device receives requests of data reading from or writing to the virtual disk group, reading from or writing to the second disk group.

15. The method according to claim 13, further comprising:
recording a data size of data written to the first disk group; and
writing data written to the first disk group to the third disk group that is put into the power-on state at the predetermined first timing when the recorded data size exceeds a predetermined size.

16. The method according to claim 14, further comprising:
turning on the power of the second disk group that is the power-off state at a predetermined second timing that comes before at least once before the predetermined first timing;
writing data that was written to the first disk group while the second disk group was in the power-off state to the second disk group that is put into the power-on state at the predetermined second timing; and
shutting off power supply to the second disk group again after writing to the second disk group that is put into the power-on state at the predetermined second timing.

* * * * *